United States Patent [19]
Wachter et al.

[11] Patent Number: 5,889,490
[45] Date of Patent: Mar. 30, 1999

[54] METHOD AND APPARATUS FOR IMPROVED RANGING

[76] Inventors: Eric A. Wachter, 138 Bay Path Dr., Oak Ridge, Tenn. 37830; Walter G. Fisher, 7114 Ashburton Dr., Knoxville, Tenn. 37909

[21] Appl. No.: 65,952

[22] Filed: Apr. 24, 1998

Related U.S. Application Data

[63] Continuation-in-part of Ser. No. 692,183, Aug. 5, 1996, Pat. No. 5,745,437.

[51] Int. Cl.$^6$ ........................................... G01S 15/00
[52] U.S. Cl. ........................................ 342/127; 367/100
[58] Field of Search ............................ 367/100; 342/105, 342/107, 109, 118, 127, 129, 131, 137, 194, 18

[56] References Cited

U.S. PATENT DOCUMENTS

| | | | |
|---|---|---|---|
| 3,298,024 | 1/1967 | Bohm | 342/127 |
| 3,614,226 | 10/1971 | Vergoz | 342/118 |
| 3,652,161 | 3/1972 | Ross | 342/118 |
| 3,735,403 | 5/1973 | Sykes | 342/194 |
| 5,455,588 | 10/1995 | Lew et al. | 342/109 |
| 5,497,160 | 3/1996 | Koehler et al. | 342/127 |
| 5,745,437 | 4/1998 | Wachter . | |

OTHER PUBLICATIONS

R.T.H. Collis and P.B. Russell, Topics in Applied Physics, vol. 14, Laser Monitoring of the Atmosphere, E.D. Hinckle (ed), Springer–Verlag, New York, pp. 79–80, 1976.

N. Takeuchi, N. Sugimoto, H. Baba and K. Sakuri, "Random Modulation CW Lidar," Applied Optics, 22 (1983) 1382–1386, 1983.

N. Takeuchi, H. Baba, K. Sakurai and T. Ueno, "Diode–Laser Random–Modulation CW LIDAR," Applied Optics, 25 (1986) 63–67, 1986.

L. Mullen and P.R. Herczfeld, "Ocean Mass Simulator for Underwater LIDAR Applications," IEEE Oceans, vol. II (1993) 365–368.

L. Mullen, A. Vieira, P.R. Herczfeld and V.M. Contarino, "Experimental and Theoretical Analysis of a Microwave–Modulated LIDAR System," Proceedings of the 24th European Microwave Conference, Sep. 1994, p. 1691, 1994.

L. Mullen, P. R. Herczfeld and V.M. Contarino, "Modulated Pulse LIDAR System for Shallow Underwater Target Detection," Oceans '94 Student Poster Program, IEEE Oceanic Engineering Society Newsletter, Winter 1994, pp. 15–19, 1994.

(List continued on next page.)

*Primary Examiner*—Daniel T. Pihulic

[57] ABSTRACT

A high resolution ranging method is described utilizing a novel modulated waveform, hereafter referred to as coherent burst modulation. In the coherent burst method, high frequency modulation of an acoustic or electromagnetic transmitter, such as a laser, is performed at a modulation frequency. This modulation frequency is transmitted quasi-continuously in the form of interrupted bursts of radiation. Energy from the transmitter is directed onto a target, interacts with the target, and the returning energy is collected. The encoded burst pattern contained in the collected return signal is detected coherently by a receiver that is tuned so as to be principally sensitive to the modulation frequency. The receiver signal is processed to determine target range using both time-of-flight of the burst envelope and phase shift of the high frequency modulation. This approach effectively decouples the maximum unambiguous range and range resolution relationship of earlier methods, thereby allowing high precision ranging to be conducted at arbitrarily long distances using at least one burst of encoded energy. Performance of such method and apparatus is significantly improved through use of phase alternation methods that compensate for non-ideal behavior of the ranging apparatus or of the target and its environment. Such phase alternation methods may be achieved by varying the phase of the transmitter or receiver channels. Moreover, methods for reduction of potential uncertainty in absolute range measurement are taught that make use of coherent signal components at twice the nominal modulation frequency.

20 Claims, 4 Drawing Sheets

OTHER PUBLICATIONS

P.S. Millar, K.D. Christian and C.T. Field, "Demonstration of High Sensitivity laser Ranging System," Proceedings of the Semiconductor Lasers Advanced Devices and Applications Conference, Paper TuB4–1, OSA Technical Digest Series vol. 20, Aug. 21–23, 1995.

J.B. Abshire. P.S. Millar, X. Sun, "Semiconductor Laser–Based Ranging Instrument for Earth Gravity Measurements, " Proceedings of the Semiconductor Lasers Advanced Devices and Applications Conference, paper TuB5–2, OSA Technical Digest Series vol. 20, 1995.

R.I. MacDonald, "Frequency Domain Reflectometer,", Applied Optics, 20 (1981) 1840–1844, 1981.

R.I. MaDonald and Brent E. Swekla, "Frequency Domain Optical Reflectometer Using a GaAs Optoelectronic Mixer," Applied Optics, 29 4578–4582, 1990.

S. Venkatesh and D.W. Dolfi, "Incoherent Frequency Modulated CW Optional Reflectometry with Centimeter Resolution," Applied Optics, 29 (1990) 1323–1326.

E.A. Wachter, T.C. Farrar and M.J. Kontney, A Quadrature Detection Scheme for Pulsed Ion–Cyclotron Resonance Mass Spectrometry, International Journal of Mass Spectrometry and Ion Processes, 1991, 169–179, 103, Elsevier Science Publishers B.V., Amsterdam.

METHOD AND APPARATUS FOR IMPROVED RANGING

CROSS REFERENCES TO RELATED MATERIALS

The present application is a continuation-in-part of U.S. Pat. No. 5,745,437, issued on 28 Apr., 1998 (application Ser. No. 08/692,183, filed Aug. 5, 1996).

ASSIGNMENT

This invention was made with government support provided by the United States Air Force under SBIR Contract Nos. F08630-96-C-0049 and F08630-97-C-0018. The Government has certain rights in this invention.

BACKGROUND OF THE INVENTION

1. Field of the Invention:

The present invention relates generally to improved methods and apparatus for measuring distance to a target, velocity of the target, and composition or identity of the target, which can be a solid, liquid or vapor. Transceiver energies used with the method may be in the acoustic energy band or in the optical, x-ray, radio-frequency, microwave, millimeter-wave or other electromagnetic energy bands.

2. Description of the Prior Art:

An urgent need exists in many industries, disciplines and governmental interests for a method capable of rapidly and precisely measuring any combination of distance, velocity, or composition or identity of a remote target. To be practical, such a method must be usable with most or all types of acoustic or electromagnetic transmitters, such as ultrasonic, laser or microwave transmitters; it must utilize relatively simple instrumentation and components for fabrication; it must provide high resolution at both short and long range; it must provide high discrimination against background noise; it must require relatively low transmitter powers; and it must be capable of correcting for non-optimal system performance and measurement conditions.

For the typical example of laser ranging, the prior art is substantially represented by only two fundamental ranging principles. One is time-of-flight (TOF) ranging and the other is continuous wave (CW) ranging. The fundamental concepts represented by these methods and by apparatus based on these methods are essentially similar for numerous applications and devices used in other bands of the electromagnetic spectrum, such as the microwave band, and in acoustic bands, such as the ultrasound band. Accordingly, for the sake of clarity, we will focus description of prior art primarily on laser ranging.

Although the approaches represented by TOF and CW ranging are well represented commercially and in the technical literature, their respective performance characteristics are less than desired. In both approaches, instantaneous ranging that is both highly precise and unambiguous at short and long range is essentially impossible due to fundamental limitations. Specifically, these prior methods operate as follows:

TOF Laser Ranging.

A short pulse of energy emitted from a transmitter is used to illuminate a target, and a portion of the transmitter signal returning from the target is subsequently detected using a high speed receiver. The temporal delay between transmission and detection is measured to determine range, based on the relationship, $R=ct/2$, where R is the distance from the transceiver to the target, c is the speed of light, and t is elapsed time between transmission and reception. Range resolution, $\Delta R$, is related to rise time of the laser pulse, $\tau_r$, and system signal-to-noise ratio, SNR, according to the relationship, $\Delta R=c\tau_r/(2\ SNR)$, where $\tau_r$ is equal to approximately 0.7 times the pulse width, and a typical minimum SNR at maximum range is 8. Typical values for $\Delta R$ are 50–500 mm at maximum range, $R_{MAX}$. A low transmitter duty cycle must be used to prevent overlap of return signals from distant targets. Accordingly, the maximum unambiguous range, $R_{AMB}$, is related to pulse repetition frequency, PRF, by the relationship, $R_{AMB}=c/2\ PRF$ (at PRF=10 kHz, $R_{AMB}=15$ km). High speed, incoherent detection systems are commonly used (where the detector rise time $<<\tau_r$), making discrimination against optical interferences and electronic noise relatively poor. Averaging of multiple transmitter pulses or use of high pulse energies can ameliorate the effects of such noise, but this approach generally dictates significant compromises in total measurement time and in eye-safety. In general, the TOF approach is most amenable to use at very long distances, where the compromises between large $R_{AMB}$ and large absolute $\Delta R$ performance may not be a significant concern. Conversely, the TOF approach is poorly suited for measurement of targets at close range, where the magnitude of $\Delta R$ becomes large relative to R.

In this simple example of TOF laser ranging, the optical frequency of the transmitted radiation constitutes a carrier frequency upon which an encoding pattern is imposed, specifically a binary off-on-off pattern that is emitted as a short burst of optical energy. The detector can be made primarily responsive to this carrier through the use of an optical bandpass filter in the receiving optics. In other energy bands, such as microwaves, the carrier might be a specific microwave frequency that is transmitted in the form of a burst of microwave energy at the specific frequency, while detector response might be limited primarily to that transmitted microwave carrier frequency using electronic bandpass filtering. In both cases, this mode of detection is referred to as incoherent (or direct) detection, because there exists no defined phase relationship between the transmitted signal and the received signal. Hence, phase-sensitive means cannot be used to discriminate noise at the carrier frequency, such as background light, that arrives at the detector during the measurement period.

CW Laser Ranging.

Range information is obtained by modulating a CW carrier frequency with a characteristic pattern, such as a sinusoidal amplitude pattern or a saw-tooth frequency or phase modulation envelope imposed on an optical carrier. Phase delay between the transmitted signal and the detected return signal is measured to determine range according to the relationship, $R=\delta c/2f$, where $\delta$ is the fractional phase shift between the transmitted signal and the return signal, c is the speed of light, and $f$ is the modulation frequency of the laser. The wavelength of this modulation, $\lambda$, is related to $f$ by the relationship, $\lambda=c/f$. Range resolution is related to minimum measurable fractional phase shift, $\Delta\delta$, and modulation frequency, $f$, according to the relationship, $\Delta R=\Delta\delta c/2f$. Hence, if $f=100$ MHz and $\Delta\delta=0.001$, then $\Delta R=1.5$ mm. $R_{AMB}=\lambda/2=c/2f$ (when $\delta\geq 1$). This is the case since phase delay is linearly proportional to distance: at long distance or at high modulation frequencies, phase shifts in excess of $2\pi$ will occur that cannot be distinguished from degenerate solutions to the equation $R=(\delta+n)c/2f$, where n is an integer multiple of $R_{AMB}$. Hence, for $f=100$ MHz, $R_{AMB}=1.5$ m. To avoid range ambiguity arising from aliasing of the modulated signal, modulation frequency can be reduced (reducing ranging precision), or several modulation frequencies can be used in succession (increasing measurement time). For example, chirped or multiple modulation frequencies can be used to circumvent some of these limitations. A major advantage of CW ranging is that coherence can be maintained between the transmitter and detector based on the encoded modulation pattern. This allows strong rejection of incoherent noise from ambient sources, such as sunlight.

Coherent Laser Ranging.

Various optical and electronic coherence methods may be used to enhance the performance in both TOF and CW ranging. The term "coherence" refers to a measurement system that maintains a controlled phase relationship between the transmitted and detected signals, either at the fundamental carrier frequency of the transmitted electromagnetic radiation (for example, where optical coherence is achieved using 785 nm light, which corresponds to a carrier frequency of $3\times10^{14}$ Hz) or by imposition of a coherent modulation frequency upon the carrier frequency (such as amplitude modulation of 785 nm light at 100 MHz). Either approach facilitates sensitive and selective detection of the transmitted signal by allowing phase-sensitive processing methods to be applied to the detected return. For example, optical mixing techniques are sometimes used to extract information from the return of a highly stable optical carrier, and may be useful for determining radial target velocity. In contrast, radio-frequency (RF) modulation of transmitter amplitude, frequency, or phase can be used to effect electronic coherence between a transmitted waveform and a reference oscillator. Mixing of the receiver signal with the reference allows phase sensitive demodulation to be performed. The two approaches may be combined, for example to obtain simultaneous range and Doppler information, while several advanced variations of these general methods have been used to further extend performance. These include: pseudo random modulation (RM) and phase modulation (PM), which represent further variations from conventional methods wherein temporal delay to maximum correlation is used to calculate range. These basic concepts have seen further development in the field of reflectometry, where various combinations of electronic and optical mixing have been used to optimize $R_{AMB}$ or $\Delta R$. Similar implementations in laser ranging are beginning to evolve. Other hybrid approaches, such as amplitude modulation of a frequency-chirped sub-carrier, are also being developed. Unfortunately, these approaches fail to simultaneously optimize $R_{AMB}$ and $\Delta R$, while the additional hardware overhead increases system cost and complexity.

Importantly, specific implementations of the aforementioned ranging methods may exhibit complications that cause the transmitted or received ranging signal to differ from optimal conditions, thereby resulting in reduced sensitivity or erroneous determination of range or other measurable parameters. Such complications may arise due to imperfections in instrumental design or operation, effects of target properties, or interference from atmospheric effects or spurious electromagnetic energies. Suppression methods for some such complications have previously been applied in other disciplines, such as the phase-alternation schemes described by Wachter et al. (International Journal of Mass Spectrometry and Ion Processes, 103 (1991) 169–179). However, such methods have not previously been applied to ranging methods and apparatus.

Numerous innovations for ranging have been provided in the prior art that are adapted to be used. Even though these innovations may be suitable for the specific individual purposes to which they address, they would not be suitable for the purposes of the present invention as heretofore described.

While the concepts of TOF and phase-based ranging have been taught using various combinations of an interrupted burst of energy at a carrier frequency, modulating this carrier, and using various coherent demodulation methods on the resultant signal, the advantages and implications of a new ranging method that combines the best features of each of these has not been previously taught nor appreciated. Moreover, the application of advanced methods for suppression of instrumental or environmental complications to such a new ranging method has not been previously taught nor appreciated.

SUMMARY OF THE INVENTION

The present invention relates generally to methods and apparatus for measuring any combination of distance to a target, velocity of the target, and composition or identity of the target, which can be a solid, liquid or vapor. Transceiver energies used with the method may be in the acoustic energy band or in the optical, x-ray, radio-frequency, microwave, millimeter-wave or other electromagnetic energy bands.

These and other objects of the invention to be described or made apparent hereafter, are accomplished by employment of a coherent, quasi-continuous interrupted burst of acoustic or electromagnetic radiation (for example, emission from a gated, modulated laser, where the laser wavelength provides a carrier signal for a burst of a particular modulation frequency). This provides an encoding pattern necessary for achieving high precision, electronic coherent ranging at short to long distances using transmissions consisting of one or more individual modulation envelopes. Using the example of laser ranging, a burst of coherently modulated light is emitted from the laser transmitter. The RF modulation imposed on this optical carrier provides a means for obtaining high absolute precision in range measurement, while measurement of the delay from burst transmission to reception eliminates ambiguity that might otherwise arise from aliasing of the RF modulation. Hence, accurate ranging with high precision can be achieved using one or more transmitter bursts.

The method utilizes electronic coherence means for signal encoding and decoding, which are generally more rugged than direct optical or other means used in prior art.

Because pertinent ranging information is encoded directly into the burst return signal at the modulation frequency, standard electronic methods for coherent demodulation (such as heterodyne or superheterodyne demodulation) can be readily employed. This provides an inherently simple means for obtaining high sensitivity and good noise suppression. Various transmitter and receiver phase alternation methods are taught that enable improved performance of such ranging systems, even under conditions of highly non-ideal transmitter modulation or low fidelity in signal reception.

The method taught herein is extremely flexible, and as such is applicable to numerous other implementations beyond that exemplified by a simple interrupted burst, including use with standard CW methods and apparatus. The modulation schemes taught here can be easily implemented with such approaches to afford immediate improvement in performance of such CW systems. Likewise, coherent burst modulation methods are compatible with conventional TOF approaches, where their use would improve both distance resolution and sensitivity.

Accordingly, it is a primary object of the present invention to teach a method and apparatus useful for instantaneously obtaining high precision ranging measurements at both short and long range.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DESCRIPTION OF THE PREFERRED EMBODIMENT

For clarity of illustration throughout the following descriptions, an optical ranging apparatus utilizing amplitude modulated laser energy is represented in detail. However, it must be noted that the method employed in construction and operation of the example optical apparatus can be easily adapted for use with other forms of electromagnetic radiation, including conventional radio-frequency, microwave, millimeter-wave, x-ray, and other electromagnetic energies, as well as with acoustic energy. In accordance with any of these potential specific embodiments of the invention, the ranging method taught herein is based on measurement of the finite time required for a transmitter signal to traverse the distance separating the transmitter from a target of interest, then traverse an essentially equivalent distance back from the target to a receiver that is substantially co-located with the transmitter. It is assumed that interaction of transmitted energy with the target is virtually instantaneous relative to the minimum measurement period of interest, and that this interaction occurs as a result of reflection, scatter, or other means of interaction of the transmitted energy with the target. Thus, it is the primary object of the present invention to teach an improved method and apparatus capable of measuring distance to a remote target with greater accuracy, precision, and speed than that possible using prior art. The basic configurations of such a ranging method and apparatus are described in U.S. Pat. No. 5,745,437 which is assigned to the assignee of the present invention and which has inventors in common with this present application. U.S. Pat. No. 5,745,437 is incorporated herein by reference in its entirety.

Figure 1:
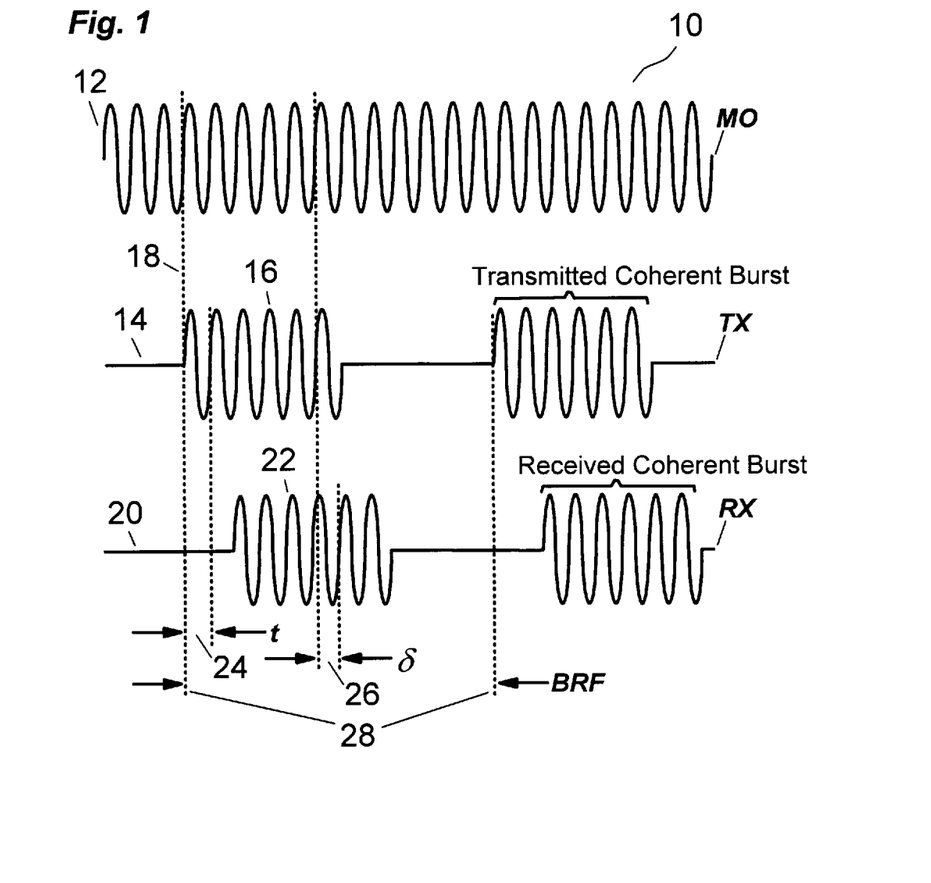
FIG. 1 shows the general coherent burst method for simultaneous measurement of coarse and fine distance.

First referring to FIG. 1 which shows a general coherent burst (CB) method (10) for simultaneous measurement of coarse and fine distance having the following features: reference signal, MO (12), transmitter signal, TX (14), transmitted coherent burst (16), phase-coherence (18), receiver signal, RX (20), received coherent burst (22), delay time, t (24), phase shift, δ (26), and burst repetition frequency, BRF (28). This CB method combines key features of TOF and CW methods to allow simultaneous optimization of ΔR and $R_{AMB}$. Specifically, a quasi-continuous interrupted burst of modulated radiation is used to encode TX such that TOF and phase shift can be determined based on analysis of a receiver signal, RX, resulting from interaction of TX with a remote target.

The general coherent burst method (10) for simultaneous measurement of coarse and fine distance comprises a reference signal, MO (12), characterized by a frequency, $f$, that is used in the generation of a transmitter signal, TX (14). TX consists of one or more sequentially transmitted coherent bursts (16) of high-frequency modulated electromagnetic radiation, where the high-frequency modulation is phase-coherent (18) with MO. TX is exemplified by an amplitude-modulated burst of laser light, where, for example, MO may consist of a stable RF frequency of 100 MHz (or $10^8$ Hz), that is encoded as an amplitude modulated burst on an optical carrier of 785 nm (or $3 \times 10^{14}$ Hz). TX is directed onto a target that is to be ranged or otherwise characterized. Upon interaction of TX with the target, a receiver signal, RX (20), is obtained that consists of one or more similar sequentially received coherent bursts (22) of high-frequency modulated electromagnetic radiation. RX is temporally delayed from TX by some delay time, t (24); note that t represents the number of complete elapsed cycles of the high-frequency modulation between TX and RX. RX also exhibits a phase shift, δ (26), relative to MO. If more than one transmitted coherent burst (16) is sequentially emitted by the transmitter, TX will be characterized by a burst repetition frequency, BRF (28), that is equivalent to the inverse of the temporal spacing of such sequentially transmitted coherent bursts (16); under such conditions RX will be characterized by a substantially equivalent BRF.

Target range, R, is determined according to the relationship:

$$R = c \left[ \frac{t}{2} + \frac{\delta}{2f} \right] \quad (1)$$

where c is the speed of light (if acoustic or other non-electromagnetic radiation is used, c will represent the velocity of such radiation in the medium between the transmitter and the target). Note that t provides accurate approximate distance to the target, while δ allows refinement of the precision of this measurement. This implies that like CW methods, the CB method yields range resolution that is given by $\Delta R = \Delta \delta c / 2f$. Since t represents the number of complete elapsed high-frequency modulation cycles between transmission and detection of a return, it is only necessary to measure t to a precision of $1/f$ (at $f = 100$ MHz, $1/f = 10$ ns, while typical photomultiplier tube (PMT) or avalanche photodiode (APD) rise times are on the order of 1 ns). The relationship between $R_{AMB}$ and burst repetition frequency, BRF, is similar to that for TOF: $R_{AMB} = c/2$ BRF, where it is BRF rather than PRF that determines $R_{AMB}$. Hence, by appropriate selection of $f$ and BRF, use of the CB method allows single-shot measurements of range to be achieved with high precision and accuracy at ranges far in excess of the wavelength of $f$. Because this approach decouples the range-resolution relationship of conventional methods, high absolute precision is possible at both short and long range. For example, if $f = 100$ MHz and $\Delta \delta = 0.001$, then $\Delta R = 1.5$ mm; if BRF = 10 kHz, this level of resolution is possible for $R \leq R_{AMB}$ (15 km). This performance can be achieved using individual burst envelopes, or multiple bursts can be transmitted in sequence to improve sensitivity. Furthermore, $f$ can be increased to further improve ΔR without affecting $R_{AMB}$.

When more than a single transmitted coherent burst is desired, a 50% duty cycle (TX on and off for equivalent durations, as shown in FIG. 1) will typically be used for CB encoding. Alternately, other duty cycles, either greater than or less than 50%, may be used with similar results. Modulation frequencies used in successive bursts may be identical or may differ. A quiescent period in the TX signal between transmitted coherent bursts, as shown in FIG. 1, may be used to demarcate successive bursts; alternately, a burst having another modulation frequency, or some other brief impulse of energy, transmitted in sequence with the one or more transmitted coherent bursts, may also be used to effect such demarcation.

Determination of t and δ used to solve EQN. (1) can be performed by capturing RX and determining its temporal delay and phase shift relative to TX. A convenient method for performing this analysis treats RX as a vector, making use of quadrature demodulation to determine the magnitude and phase of this vector relative to MO. The return signal as a function of time, RX(t), may accordingly be described in complex notation by the sinusoid $$RX(t) = \sin(\omega t + \delta) = \frac{e^{i(\omega t + \delta)} - e^{-i(\omega t + \delta)}}{2i}, \quad (2)$$

where $\omega = 2\pi f$. If MO is split into two orthogonal components, these may also be represented by vectors, consisting of a cosine component pointing along the real axis, $$\cos(\omega t) = \frac{e^{i(\omega t)} + e^{-i(\omega t)}}{2}, \quad (3)$$

and a sine component pointing along the imaginary axis, $$\sin(\omega t) = \frac{e^{i(\omega t)} - e^{-i(\omega t)}}{2i}, \quad (4)$$

Multiplication of RX(t) by these components will yield real and imaginary portions of the demodulated signal, Re(t) and Im(t), according to $$Re(t) = RX(t)\cos(\omega t) = \frac{1}{2}\left[\frac{e^{i(2\omega t + \delta)} - e^{-i(2\omega t + \delta)} + e^{i\delta} - e^{-i\delta}}{2i}\right] \quad (5)$$

$$= \frac{1}{2}[\sin(2\omega t + \delta) + \sin(\delta)]. \quad (6)$$

and $$Im(t) = RX(t)\sin(\omega t) = -\frac{1}{2}\left[\frac{e^{i(2\omega t + \delta)} + e^{-i(2\omega t + \delta)} - e^{i\delta} - e^{-i\delta}}{2}\right] \quad (7)$$

$$= \frac{1}{2}[-\cos(2\omega t + \delta) + \sin(\delta)]. \quad (8)$$

EQNS. (6) and (8) show that for a stationary, quiescent target, Re(t) and Im(t) will consist of components at twice the modulation frequency (2ω) and at the baseband. The baseband components of Re(t) and Im(t) can be used to determine the phase of RX(t) as a function of time, δ(t), via $$\delta(t) = \tan^{-1}(Re(t)/Im(t)), \quad (9)$$

while the magnitude of the return, M(t), is given by $$M(t) = (Re(t)^2 + Im(t)^2)^{1/2}. \quad (10)$$

These processing steps may be performed digitally on captured return and reference signals, or using hardware methods, such as with heterodyne or superheterodyne circuits commonly used in pulsed analytical spectroscopy (see, for example, Wachter et al., International Journal of Mass Spectrometry and Ion Processes, 103 (1991) 169–179).

Figure 2:
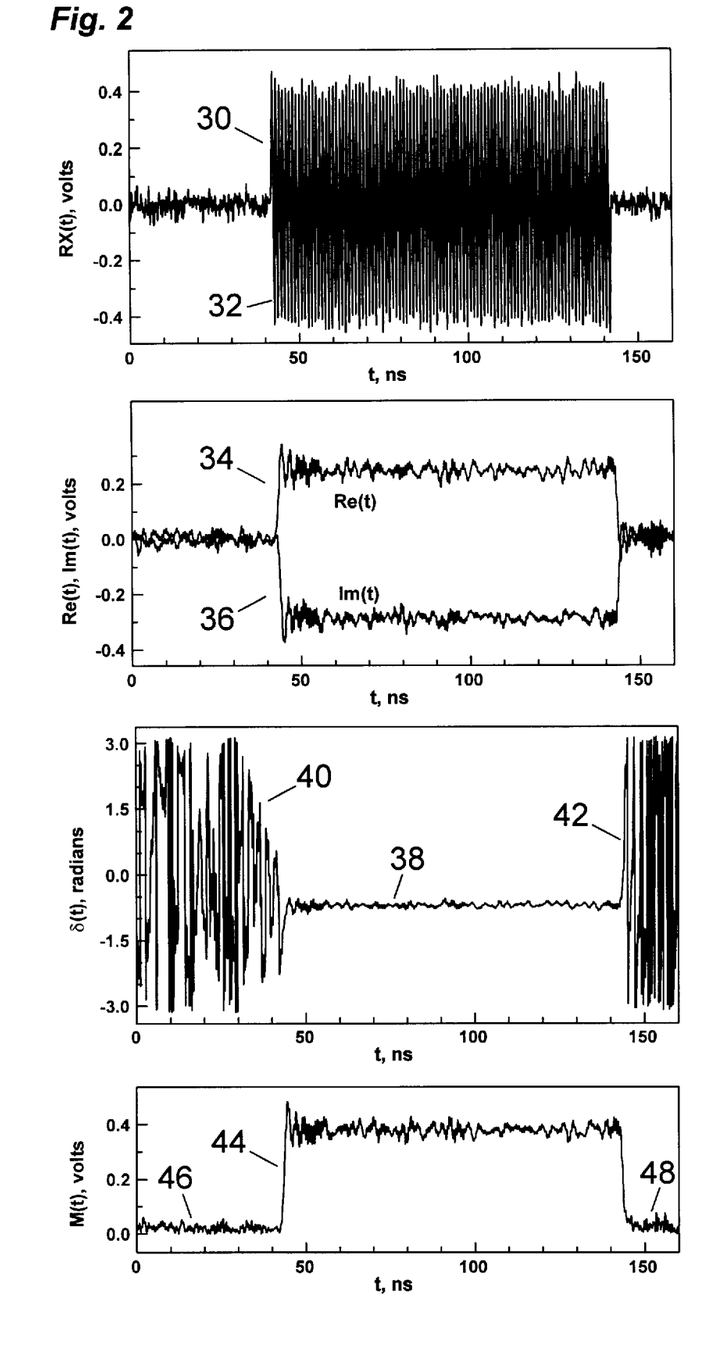
FIG. 2 shows the primary steps involved in coherent burst processing.

The steps involved in such quadrature demodulation processing are shown in FIG. 2. In this example, $f=20$ MHz. RX(t) (30) exhibits modulation (32) at $f$. Demodulation of RX(t) with cos(ωt) and sin(ωt) (which are not shown) yields Re(t) (34) and Im(t) (36). Note that Re(t) and Im(t) have been low-pass filtered using a cut-off filter at 1.65$f$; thus, only the components of Re(t) and Im(t) at the baseband are evident in FIG. 2. Analysis of Re(t) and Im(t) according to EQN. (9) yields δ(t) (38), which is stable during the period corresponding to reception of the coherent burst signal in RX(t). In contrast, δ(t) varies randomly prior to the leading edge of the received burst (40) and subsequent to the trailing edge of the received burst (42); this randomness is indicative of a lack of coherence between noise sources and MO outside of the burst envelope. Analysis of Re(t) and Im(t) according to EQN. (10) yields M(t) (44), which exhibits a plateau during the period corresponding to reception of the coherent burst signal in RX(t). In contrast, response at M(t) is essentially equivalent to zero prior to the leading edge of the received burst (46) and subsequent to the trailing edge of the received burst (48); as in the case of δ(t), such response is indicative of a lack of coherence between noise sources and MO outside of the burst envelope.

Note that in conventional pulsed analytical spectroscopy, δ(t) and M(t) are generally determined after low-pass filtering of Re(t) and Im(t) so as to eliminate components at 2ω. This simplifies analysis of δ(t) and M(t), since the analytic signals can be easily measured at the baseband. However, in the case of coherent burst ranging, it is desirable to maximize accuracy in determination of elapsed time, t. t can be estimated by examining the position of the leading or falling transition of M(t) relative to a timing reference, such as a clock circuit that is started synchronously with TX and that is locked to MO. However, low-pass filtering of Re(t) and Im(t) can substantially increase the transition time of the selected leading or falling transition of M(t) such that it is similar to or greater than the period of the clock circuit. This can make accurate estimation of t more difficult, since uncertainty in the position of t can be significant relative to the period of such a clock circuit. Analysis based on demodulation of the frequency components at 2ω (from EQNS. (6) and (8)) provides a means to ameliorate this effect, since transitions in M(t) at 2ω will have a shorter transition time than those occurring at the baseband, and can be used to substantially reduce uncertainty in estimation of t relative to the clock circuit.

Proper use of orthogonal phase components, cos(ωt) and sin(ωt), that are derived from MO allows many possible instrumental complications in the demodulation of RX(t) to be substantially avoided, including those attributable to mismatch in RF frequency response in transmitter and receiver circuitry, amplifier noise and noise pickup, channel imbalance in receiver circuitry and pickup of ambient noise signals. Compensation for imbalance can frequently be effected by adjustment of the relative phase of the orthogonal components during calibration so as to null any phase mismatch. However, despite such efforts, some non-ideal performance should always be expected from any actual ranging instrument that is based on phase-sensitive detection.

To ameliorate the severity of any such instrumental or environmental complications, a variety of phase alternation methods may be used. One of the most powerful phase alternation patterns used in such methods is the "four-burst" phase alternation sequence given in TABLE I. By completing such a sequence, artifacts resulting from instrumental drift, ground-loop noise, minor phase errors, gain imbalance in Re(t) and Im(t), ambient noise pickup, and other similar sources of error are systematically eliminated.

TABLE I

Burst sequence and co-addition
pattern used for four-burst phase alternation.

| Burst | Phase | CH A | CH B | Buffer 1 | Buffer 2 |
|---|---|---|---|---|---|
| 1 | 0° | R + α | I + β | +(CH A) = R + α | +(CH B) = I + α |
| 2 | 90° | −I + α | R + β | +(CH B) = 2R + α + β | −(CH A) = 2I + β − α |
| 3 | 180° | −R + α | −I + β | −(CH A) = 3R + β | −(CH B) = 3I − α |
| 4 | 270° | I + α | −R + β | −(CH B) = 4R | +(CH A) = 4I |

Specifically, in TABLE I., each row corresponding to "Burst" 1–4 represents one or more coherent bursts transmitted with the phase shown; "Phase" represents the phase of the respective TX signal relative to an arbitrary phase reference that is locked to MO; "CH A" is the identity of the signal observed for Re(t) for the given phase; "CH B" is the identity of the signal observed for Im(t); "R" represents the real component of the demodulated signal; "I" represents the imaginary component of the demodulated signal; "α" represents a non-ideal component observed at CH A, such as noise or phase mis-matching; "β" represents a non-ideal component observed at CH B, such as noise or phase mismatching. Hence, for Burst 2, TX phase=90°, and the signal observed in CH B represents the real component of the demodulated signal, R, along with a non-ideal component, β. The values in "Buffer 1" and "Buffer 2" show manipulations necessary to obtain the real and imaginary components, R and I, from the signals observed in CH A and CH B, along with the overall results of the respective manipulations as each row of the burst sequence is executed. Hence, for Burst 2, the value observed in CH B is added to the contents of Buffer 1. Note that the specific order of bursts in this sequence may be varied, and that more than one coherent burst may be used to complete each step of this sequence. Also, instead of changing the phase of TX in each step, the phase of the orthogonal phase components, cos(ωt) and sin(ωt), that are mixed with RX may be stepped through a substantially equivalent pattern in order to achieve equivalent results.

For apparatus lacking capability to alternate phase in 90° increments, a modified method based on a 180° phase alternation pattern may be used to reduce the significance of some instrumental and environmental factors; this is shown in TABLE II. Although this approach minimizes the effect of coherent noise in each of the channels, it does not resolve problems due to gain differences between CH A and CH B.

TABLE II

Burst sequence and co-addition
pattern used in two-burst phase alternation.

| Burst | Phase | CH A | CH B | Buffer 1 | Buffer 2 |
|---|---|---|---|---|---|
| 1 | 0° | R + α | I + β | +(CH A) = R + α | +(CH B) = I + α |
| 2 | 180° | −R + α | −I + β | −(CH A) = 2R | −(CH B) = 2I |

The phase alternation patterns described in TABLES I. and II. afford particular value when used in laser ranging apparatus that are based on modulated diode lasers. Such lasers are difficult to modulate sinusoidally, due to their inherently non-linear optical output as a function of drive level. The resultant non-sinusoidal modulation can produce erroneous estimates of phase and magnitude based on the analysis approach outlined in EQNS. (2)–(10). Application of phase alternation methods allows the effects of such non-linear behavior to be minimized, avoiding potential erroneous estimation of δ(t) or M(t). Specifically, phase alternation enables even such non-ideal modulation patterns as binary modulation (TX on/off) to be used successfully with the CB method.

Figure 3:
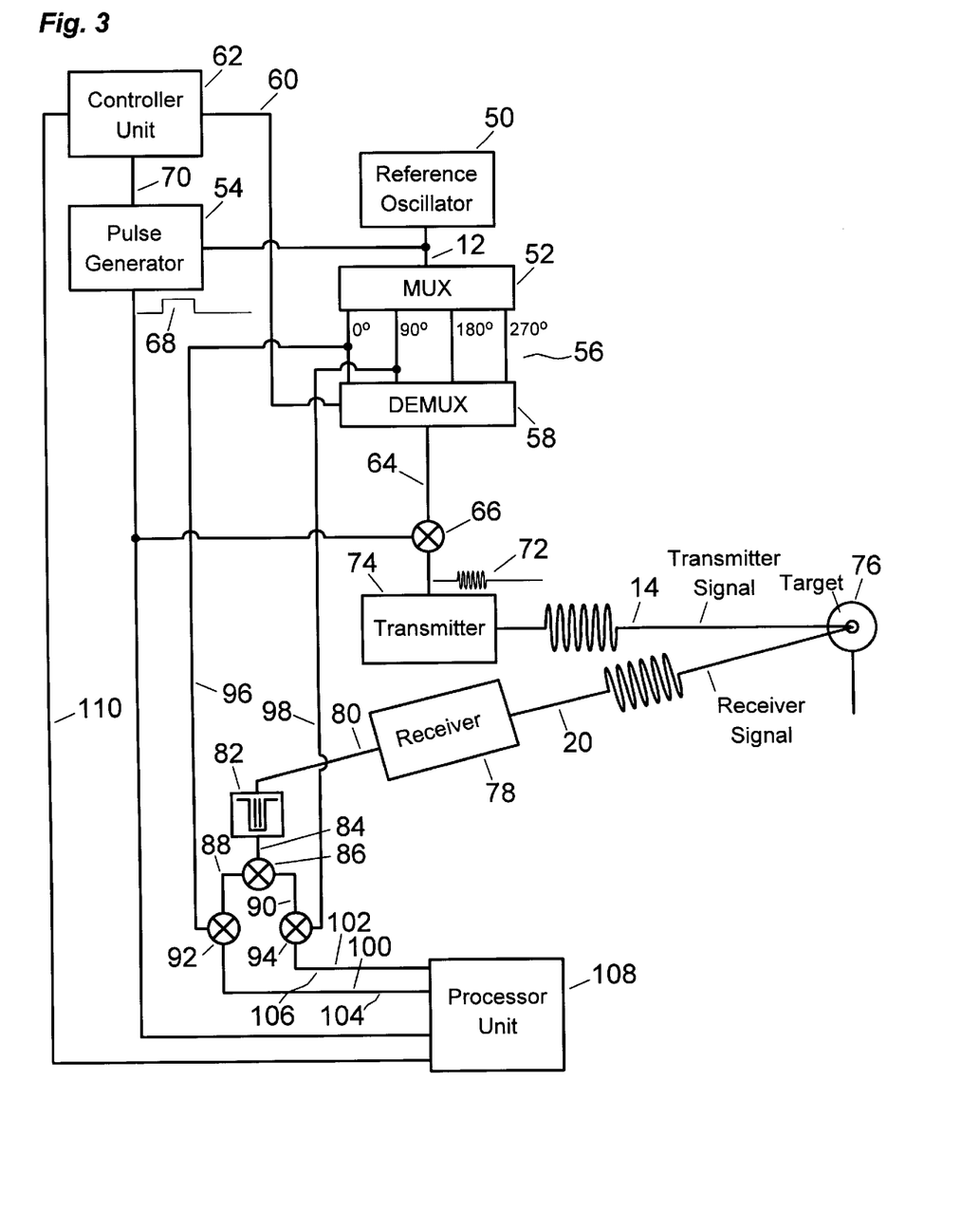
FIG. 3 is a pictorial schematic for describing an invention assembly and operation wherein phase of a transmitter signal may be varied using a phase alternation sequence.

Referring now to FIG. 3, which shows a schematic of the principal componentry necessary for generation and heterodyne demodulation of a transceiver signal using the "four-burst" phase alternation sequence and having the following features: reference signal (12), transmitter signal (14), receiver signal (20), reference oscillator (50), quadrature multiplexer (52), pulse generator (54), four orthogonal components (56), demultiplexer (58), phase control signal (60), controller unit (62), transmitter phase signal (64), mixer (66), gating pulse (68), pulsing command (70), gated transmitter signal (72), transmitter (74), target (76), receiver (78), electronic representation (80), bandpass filter (82), bandwidth limited signal (84), power splitter (86), first of two equal components signal (88), second of two equal components signal (90), first of two demodulators (92), second of two demodulators (94), first secondary reference signal (96), second secondary reference signal (98), first signal thus issued (100), second signal thus issued (102), first phase component (104), second phase component (106), processor unit (108) and phase control signal (110). Phase alternation in this configuration is achieved by varying the phase of TX relative to a constant RX phase.

A reference oscillator (50), such as a temperature controlled crystal oscillator, provides a continuous reference signal (12) to a quadrature multiplexer (52) and pulse generator (54). The multiplexer (52) serves to divide the continuous reference signal (12) into four orthogonal components (56) having phases at 0°, 90°, 180°, and 270° relative to a phase reference that is locked to the continuous reference signal (12). A demultiplexer (58) selects one of these four orthogonal components (56) in response to a phase control signal (60) issued by a controller unit (62), thereby producing a transmitter phase signal (64). The transmitter phase signal (64) is gated through a mixer (66) that serves as a fast switch under stimulation of a gating pulse (68) derived from the pulse generator (54). The gating pulse (68) is issued in response to a pulsing command (70) issued by the controller unit (62). The gated transmitter signal (72) thereby produced drives a transmitter (74), causing it to emit a transmitter signal (14). The transmitter signal (14) interacts with a target (76) to produce a receiver signal (20) that is detected by a receiver (78) and converted into an electronic representation (80). The bandwidth of the electronic representation (80) of the receiver signal (20) is substantially limited to a band of frequencies closely distributed about that of the continuous reference signal (12) by electronic filtering that is effected in a bandpass filter (82). The bandwidth limited signal (84) emanating from the bandpass filter (82) is directed into a power splitter (86), which divides the bandwidth limited signal (84) into a first of two equal components signal (88) and a second of two equal components signal (90). These first of two equal components signal (88) and second of two equal components signal (90) are issued to a first of two demodulators (92) and second of two demodulators (94), where they are mixed with a first secondary reference signal (96) and a second secondary reference signal (98) derived from the quadrature multiplexer (52). The first secondary reference signal (96) and a second secondary reference signal (98) are made to differ in phase by 90° by pre-selecting an appropriate pair of the four orthogonal components (56). The first signal thus issued (100) and second signal thus issued (102)

by the first of two demodulators (92) and second of two demodulators (94) are in this way made to represent the first phase component (104) and the second phase component (106) of the demodulated signal. A signal processor unit (108) uses the first phase component (104) and the second phase component (106) signals to determine the phase of the demodulated signal relative to the reference signal (12) and the temporal delay of the demodulated signal relative to the gating pulse (68). The processor unit (108) is capable of averaging sequential CB signals resultant from various phase alternation sequences (such as those shown in TABLES I. and II.) under command of a phase control signal (110) issued by the controller unit (62). To alternate phase, the transmitter phase signal (64) is selected from among the four orthogonal components (56), and the appropriate buffer manipulations performed by the controller unit (62) so as to accumulate the real phase components in a first buffer and the imaginary phase components in a second buffer.

Figure 4:
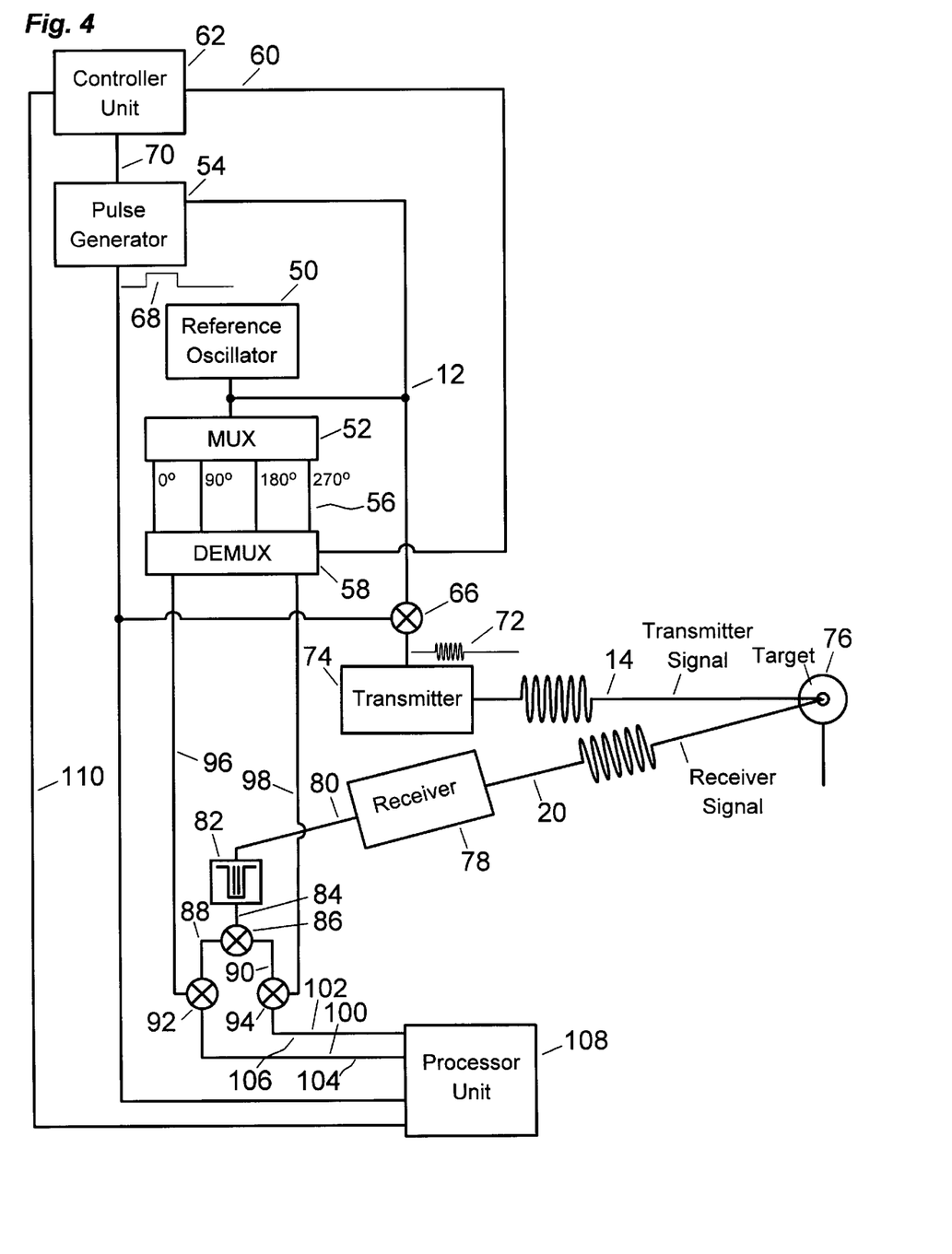
FIG. 4 is a pictorial schematic for describing an alternate invention assembly and operation wherein phase of orthogonal receiver signals may be varied using a phase alternation sequence.

Referring now to FIG. 4, which shows a schematic of alternate componentry necessary for generation and heterodyne demodulation of the transceiver signal using the "four-burst" phase alternation sequence and having the following features: reference signal (12), transmitter signal (14), receiver signal (20), reference oscillator (50), quadrature multiplexer (52), pulse generator (54), four orthogonal components (56), demultiplexer (58), phase control signal (60), controller unit (62), mixer (66), gating pulse (68), pulsing command (70), gated transmitter signal (72), transmitter (74), target (76), receiver (78), electronic representation (80), bandpass filter (82), bandwidth limited signal (84), power splitter (86), first of two equal components signal (88), second of two equal components signal (90), first of two demodulators (92), second of two demodulators (94), first secondary reference signal (96), second secondary reference signal (98), first signal thus issued (100), second signal thus issued (102), first phase component (104), second phase component (106), processor unit (108) and phase control signal (110). Phase alternation in this alternate configuration is achieved by varying the phase of RX relative to a constant TX phase.

A reference oscillator (50), such as a temperature controlled crystal oscillator, provides a continuous reference signal (12) to a quadrature multiplexer (52), a pulse generator (54), and a mixer (66). The continuous reference signal (12) issued into the mixer (66) is gated through the mixer (66) upon stimulation of said mixer (66) by a gating pulse (68) derived from the pulse generator (54). The gating pulse (68) is issued in response to a pulsing command (70) issued by a controller unit (62). The gated transmitter signal (72) thereby produced drives a transmitter (74), causing it to emit a transmitter signal (14). The transmitter signal (14) interacts with a target (76) to produce a receiver signal (20) that is detected by a receiver (78) and converted into an electronic representation (80). The bandwidth of the electronic representation (80) of the receiver signal (20) is substantially limited to a band of frequencies closely distributed about that of the continuous reference signal (12) by electronic filtering that is effected in a bandpass filter (82). The bandwidth limited signal (84) emanating from the bandpass filter (82) is directed into a power splitter (86), which divides the bandwidth limited signal (84) into a first of two equal components signal (88) and a second of two equal components signal (90). The first of two equal components signal (88) and second of two equal components signal (90) are issued to a first of two demodulators (92) and second of two demodulators (94), where they are mixed with a first secondary reference signal (96) and a second secondary reference signal (98) derived from the demultiplexer (58). The first secondary reference signal (96) and second secondary reference signal (98) represent orthogonal reference signals differing in phase by 90°, and are produced by the demultiplexer (58) in response to a phase control signal (60) issued by the controller unit (62). The outputs of the demultiplexer (58) originate from a quadrature multiplexer (52) that serves to divide the continuous reference signal (12) into four orthogonal components (56) having phases at 0°, 90°, 180°, and 270° relative to a phase reference that is locked to the continuous reference signal (12). The first signal thus issued (100) and second signal thus issued (102) by the first of two demodulators (92) and second of two demodulators (94) are in this way made to represent the first phase component (104) and the second phase component (106) of the demodulated signal. A signal processor unit (108) uses the first phase component (104) and the second phase component (106) signals to determine the phase of the demodulated signal relative to the reference signal (12) and the temporal delay of the demodulated signal relative to the gating pulse (68). The processor unit (108) is capable of averaging sequential CB signals resultant from various phase alternation sequences (such as those shown in TABLES I. and II.) under command of a phase control signal (110) issued by the controller unit (62). To alternate phase, orthogonal pairs of first secondary reference signal (96) and second secondary reference signal (98) are selected from among the four orthogonal components (56), and the appropriate buffer manipulations performed by the controller unit (62) so as to accumulate the real phase components in a first buffer and the imaginary phase components in a second buffer.

It will be clear to those of ordinary skill in the art that the foregoing example apparatus described in FIGS. 3 and 4 constitute heterodyne demodulation schemes, and that by incorporation of additional RF mixing circuitry at the signal source and demodulation end such examples may be readily extended to include superheterodyne demodulation, thereby facilitating agility in modulation frequency. It will also be clear that other phase alternation patterns may be used to further extend performance or range of application, and that use of such other patterns is encompassed within this invention.

It will be clear that while the foregoing disclosure has focused on example methods, apparatus and applications using transmitted optical radiation to determine range of a remote target, the invention is not limited solely to ranging, and in fact is applicable to numerous other applications, including measurement of radial target velocity and target composition. For example, analysis of one or more frequency components present in $\delta(t)$ provides a simple and reliable means for determining radial target velocity, including translation and vibration of the target, based on target-induced Doppler shift of RX relative to MO and TX. Such information may find use in characterization of mobile or non-quiescent targets, for example for identification or characterization of distant aircraft or zones of turbulent air. Such characterization may include analysis of acoustic fingerprints at multiple Doppler frequencies in order to identify one or more remote targets based on known patterns of such fingerprints, even when such fingerprints are superimposed on a background of Doppler frequencies originating from other sources. Further, while the foregoing disclosure has focused on example methods, apparatus and applications using single transmitter and detector units configured so as to operate with a single modulation frequency, the invention is not limited solely to such constructions, and in fact is applicable to any combination of a plurality of transmitters, detectors, and modulation frequencies. For example, two or more laser wavelengths having independent modulation frequencies may be transmitted substantially simultaneously or sequentially in rapid succession, for example to determine chemical composition or identity of a target responsive to the two or more laser wavelengths. Also, two or more modulation frequencies may be transmitted substantially simultaneously or sequentially in rapid succession from a single transmitter, for example to determine physical composition or identity of a target responsive to the two or more modulation frequencies, wherein each of the two or more modulation frequencies resultant in a receiver signal are processed so as to demultiplex each portion of the receiver signal emanating from independent interaction of each of the at least two independent modulation frequencies with the target.

It will also be clear that while the foregoing disclosure has focused on example apparatus and applications using optical radiation and solid targets, the invention is not limited to optical radiation nor to solid targets. In fact, the invention is applicable to use on targets consisting of or contained within virtually all forms of matter, including liquids, gases, vapors, aerosols, mists, dusts, and other particulate forms, along with various solids. If suitable energy sources are used, ranging of targets located within "opaque solids", such as in rocks, buildings, or below the surface of the earth, is made possible and practical through employment of the invention. For example, a single x-ray transceiver could be employed with the coherent burst method to detect buried objects with high precision and accuracy. A second example application is wind shear detection, for which the coherent burst method could be employed using either optical or microwave energies to measure the motion of vapor particles or air molecules. A third example application is detection of breaks or other anomalies in optical fibers, for which the coherent burst method could be employed using optical sources such as diode lasers. A fourth example application is two- or three-dimensional ultrasonic or laser imaging, where the coherent burst method could be used to increase data rates and range precision in scanned or staring imaging devices.

Further, while modulation patterns consisting substantially of a sinusoidal encoding pattern have been the primary focus of the foregoing examples, it will be clear that many other encoding patterns are encompassed within the invention, including square wave amplitude modulation, pseudo random patterns, along with various phase, frequency and polarization modulation approaches. Also, it will be clear that the encoding pattern and modulation frequency can be changed randomly, in order to reduce interference from coherent noise sources or to provide a means for providing security in the transmission and reception of encoded information. Also, it will be clear that the modulation and demodulation methods taught herein are applicable for numerous uses beyond those limited to the specific examples of the coherent burst, including applications involving substantially continuous modulation, wherein the advantages taught for phase alternation are directly transferable. Also, it will be clear that other demodulation methods are encompassed within the invention, including correlation based methods.

It will be understood that each of the elements described above, or two or more together, may also find an useful application in other types of constructions differing from the type described above.

While the invention has been illustrated and described as embodied in a general method for simultaneous measurement of coarse and fine distance, it is not intended to be limited to the details shown, since it will be understood that various omissions, modifications, substitutions and changes in the forms and details of the devices illustrated and in operation of such devices can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A general method for simultaneous measurement of coarse and fine distance consisting of the steps of:
    A) forming at least one transmitter signal by applying at least one coherent burst drive signal to at least one transmitter, wherein the at least one coherent burst drive signal comprises high-frequency modulated energy having at least one modulation frequency which is phase-coherent with at least one reference signal and wherein the phase of said at least one coherent burst drive signal is variable relative to at least one demodulation reference signal that is also phase-coherent with the at least one reference signal;
    B) transmitting the at least one transmitter signal onto at least one target;
    C) reflecting a portion of the high-frequency modulated radiation transmitter signal by the at least one target;
    D) collecting a portion of the reflected high-frequency modulated radiation emanating from the at least one target by a receiver to form a receiver signal;
    E) processing the receiver signal from the receiver using at least one bandwidth limited processor unit and said at least one demodulation reference signal to form at least one first phase component and at least one second phase component;
    F) processing the at least one first phase component and the at least one second phase component to determine one or more target parameters selected from a group consisting of range, velocity and composition of the at least one target.

2. The general method for simultaneous measurement of coarse and fine distance as described in claim 1, wherein the relative phase of said at least one coherent burst drive signal and said at least one demodulation reference signal are varied systematically in a repetitive pattern.

3. The general method for simultaneous measurement of coarse and fine distance as described in claim 2, wherein the step of processing the at least one first phase component and the at least one second phase component further comprises measurement of at least one phase shift between the at least one transmitter signal and the receiver signal for the at least one modulation frequency and wherein the at least one measured phase shift is used to precisely determine range of the at least one target in a substantially instantaneous fashion.

4. The general method for simultaneous measurement of coarse and fine distance (10) as described in claim 2, wherein the step of processing of the at least one first phase component and the at least one second phase component further comprises the steps of:
    A) determining at least one delay time between transmission of the at least one transmitter signal and reception of the receiver signal;

B) determining at least one phase shift between the at least one transmitter signal and the receiver signal for the at least one modulation frequency.

5. The general method for simultaneous measurement of coarse and fine distance as described in claim 4, wherein the step of processing of the at least one first phase component and the at least one second phase component further comprises the steps of:
   A) determining unambiguous range of the at least one target on a coarse scale using the measured at least one delay time between transmission of the at least one transmitter signal and reception of the receiver signal;
   B) determining precise range of the at least one target on a fine scale using the at least one measured phase shift between the at least one transmitter signal and the receiver signal for the at least one modulation frequency;
   C) combining the determined coarse scale unambiguous range and the fine scale precise range to determine the precise unambiguous range of the at least one target.

6. The general method for simultaneous measurement of coarse and fine distance as described in claim 3, wherein the step of processing of the at least one first phase component and the at least one second phase component further comprises the step of determining a change in the at least one measured phase shift as a function of time which functions to determine at least one velocity of the at least one target.

7. The general method for simultaneous measurement of coarse and fine distance as described in claim 4, wherein the step of processing of the at least one first phase component and the at least one second phase component further comprises the step of determining the change in the at least one measured phase shift as a function of time which functions to determine at least one velocity of the at least one target.

8. The general method for simultaneous measurement of coarse and fine distance as described in claim 5, wherein the step of processing of the at least one first phase component and the at least one second phase component further comprises the steps of:
   A) determining precise unambiguous range of the at least one target using the combined at least one measured delay time and the at least one measured phase shift;
   B) determining at least one velocity of the at least one target by measuring a change in the at least one measured phase shift as a function of time;
   C) combining the determined precise unambiguous range and at least one determined velocity to simultaneously determine range and at least one velocity of the at least one target.

9. The general method for simultaneous measurement of coarse and fine distance as described in claim 2, wherein at least two independent transmitter signals each having at least one independent modulation frequency are directed simultaneously onto at least one target, the at least two independent transmitter signals interact independently with the at least one target, a portion of the high-frequency modulated radiation from each of the at least two independent transmitter signals is reflected by the at least one target, a portion of the reflected high-frequency modulated radiation from each of the at least two independent transmitter signals is collected by a receiver to form a receiver signal and the receiver signal is processed to demultiplex each portion of the receiver signal emanating from independent interaction of each of the at least two independent transmitter signals with the at least one target.

10. The general method for simultaneous measurement of coarse and fine distance as described in claim 2, wherein at least two independent modulation frequencies are used to form a single transmitter signal, the single transmitter signal is directed onto at least one target, the single transmitter signal interacts with the at least one target, a portion of the high-frequency modulated radiation from the single transmitter signal is reflected by the at least one target, a portion of the reflected high-frequency modulated radiation is collected by a receiver to form a receiver signal, and the receiver signal is processed to demultiplex each portion of the receiver signal emanating from independent interaction of each of the at least two independent modulation frequencies with the at least one target.

11. The general method for simultaneous measurement of coarse and fine distance as described in claim 1, wherein said receiver signal is processed with said at least one demodulation reference signal to form at least one demodulated signal at twice said modulation frequency, and where said at least one demodulated signal at twice said modulation frequency is used to determine unambiguous range of the at least one target on a coarse scale using at least one measured delay time between transmission of the at least one transmitter signal and at least one demodulated signal at twice said modulation frequency.

12. A general method for simultaneous measurement of coarse and fine distance consisting of the steps of:
   A) converting a continuous reference signal into a coherent burst drive signal which is issued to a transmitter to generate a transmitter signal consisting of an interrupted burst of high-frequency modulated radiation, wherein the phase of said coherent burst drive signal is variable relative to at least one demodulation reference signal;
   B) transmitting the transmitter signal from the transmitter onto a remote target which reflects a portion of the transmitter signal;
   C) detecting a return signal emanating from the remote target by a receiver that functions to produce a receiver signal;
   D) processing the receiver signal together with at least one demodulation reference signal in a demodulation unit to form at least one first phase component and at least one second phase component;
   E) processing the at least one first phase component and the at least one second phase component to determine range of the remote target.

13. The general method for simultaneous measurement of coarse and fine distance as described in claim 12, wherein the relative phase of said coherent burst drive signal and said at least one demodulation reference signal are varied systematically in a repetitive pattern.

14. The general method for simultaneous measurement of coarse and fine distance as described in claim 13, wherein:
   A) a reference oscillator comprises a reference signal source for a quadrature multiplexer;
   B) the quadrature multiplexer comprises the signal source for a demultiplexer;
   C) the quadrature multiplexer and demultiplexer are configured to operate simultaneously in coherence with the reference oscillator; and
   D) said transmitter signal and said at least one demodulation reference signal are derived from the outputs of said reference oscillator, quadrature multiplexer, and demultiplexer.

15. The general method for simultaneous measurement of coarse and fine distance as described in claim 14, wherein bandwidth-limited operation is substantially limited to the frequency of the reference oscillator, and wherein the bandwidth-limited operation is provided by one or more means selected from electronic and mathematical filtering means.

16. The general method for simultaneous measurement of coarse and fine distance as described in claim 15, wherein the bandwidth limited demodulation unit consists of a quadrature heterodyne or superheterodyne mixing circuit; and wherein the at least one first phase component and the at least one second phase component emanating from the mixing circuit are used to produce a signal proportional to the phase shift of the receiver signal relative to the transmitter signal; and wherein the signal proportional to phase shift is calibrated to obtain fine range resolution for the receiver signal.

17. The general method for simultaneous measurement of coarse and fine distance as described in claim 16, wherein the measured phase shift signal is combined with a simultaneous measurement of delay time for the at least one first phase component and the at least one second phase component to determine range.

18. The general method for simultaneous measurement of coarse and fine distance as described in claim 13 further comprising:

A) a reference oscillator;

B) a transmitter;

C) a modulation system functioning to output a modulation pattern derived from the output of the reference oscillator on the output of the transmitter;

D) a receiver for detection of a receiver signal emanating from interaction of the output of the transmitter with a target;

E) a demodulation system from which phase shift is measured in the receiver signal; and F) a processor unit configured to determine at least one velocity of the target based on the change in phase shift of the modulation frequency as a function of time.

19. An apparatus for simultaneous measurement of coarse and fine distance comprising:

A) at least one transmitter disposed to transmit at least one transmitter signal onto at least one target, wherein the at least one transmitter signal is comprised of a coherent burst modulation pattern of high-frequency modulated radiation having at least one modulation frequency which is phase-coherent with at least one reference signal, and wherein the phase of said coherent burst modulation pattern is variable relative to at least one demodulation reference signal;

B) at least one receiver disposed to receive at least one receiver signal, wherein the at least one receiver signal is comprised of an electronic representation of a portion of the reflected transmitter signal comprising high-frequency modulated radiation emanating from the at least one target;

C) at least one processor unit disposed to process the at least one receiver signal together with the at least one reference signal to produce at least one first phase component and at least one second phase component that are used to determine at least one delay time and at least one phase shift for the at least one receiver signal.

20. The apparatus as described in claim 19 further comprising a controller unit configured so as to vary the phase of said coherent burst modulation pattern relative to said at least one demodulation reference signal; and a processor unit configured so as to interpret a phase control signal issued by said controller unit and thereby process successive receiver signals in response to said varying phase.

* * * * *